(12) United States Patent
Rodolico

(10) Patent No.: US 9,451,062 B2
(45) Date of Patent: Sep. 20, 2016

(54) MOBILE DEVICE EDGE VIEW DISPLAY INSERT

(71) Applicant: Verizon Patent and Licensing Inc., Basking Ridge, NJ (US)

(72) Inventor: Joseph T. Rodolico, Horsham, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 212 days.

(21) Appl. No.: 14/041,451

(22) Filed: Sep. 30, 2013

(65) Prior Publication Data

US 2015/0094118 A1   Apr. 2, 2015

(51) Int. Cl.
*G06K 9/00* (2006.01)
*H04M 1/02* (2006.01)
*H04M 1/725* (2006.01)

(52) U.S. Cl.
CPC ....... *H04M 1/0264* (2013.01); *H04M 1/72569* (2013.01); *H04M 2250/52* (2013.01)

(58) Field of Classification Search
None
See application file for complete search history.

(56) References Cited

U.S. PATENT DOCUMENTS

| 7,383,303 | B1 * | 6/2008 | Bort | G06Q 10/109 |
| | | | | 379/201.01 |
| 8,457,366 | B2 * | 6/2013 | Cheswick | 382/118 |
| 8,493,198 | B1 * | 7/2013 | Vasquez et al. | 340/436 |
| 8,600,110 | B1 * | 12/2013 | Chan et al. | 382/103 |
| 8,633,989 | B2 * | 1/2014 | Okuda | H04M 1/0264 |
| | | | | 348/207.99 |
| 8,973,149 | B2 * | 3/2015 | Buck | G06F 21/50 |
| | | | | 726/26 |
| 9,075,435 | B1 * | 7/2015 | Noble | G06F 3/013 |
| 9,143,749 | B2 * | 9/2015 | Wernersson | H04N 5/2251 |
| 9,290,125 | B2 * | 3/2016 | Nagata | B60Q 9/008 |
| 2003/0046304 | A1 * | 3/2003 | Peskin | G06Q 10/109 |
| 2006/0052140 | A1 * | 3/2006 | Hicks, III | H04L 63/0853 |
| | | | | 455/569.1 |
| 2006/0171562 | A1 * | 8/2006 | Yoshida | 382/104 |
| 2006/0240867 | A1 * | 10/2006 | Wang | G08B 13/1672 |
| | | | | 455/556.1 |
| 2006/0261257 | A1 * | 11/2006 | Hwang | H04M 1/0264 |
| | | | | 250/216 |
| 2007/0026889 | A1 * | 2/2007 | Yamauchi et al. | 455/552.1 |
| 2008/0002025 | A1 * | 1/2008 | Kakinami | 348/115 |
| 2009/0141895 | A1 * | 6/2009 | Anderson et al. | 380/252 |
| 2009/0148149 | A1 * | 6/2009 | Chishima | G03B 17/04 |
| | | | | 396/326 |
| 2010/0046842 | A1 * | 2/2010 | Conwell | 382/218 |
| 2010/0124363 | A1 * | 5/2010 | Ek et al. | 382/118 |
| 2010/0150407 | A1 * | 6/2010 | Cheswick | 382/118 |
| 2010/0245585 | A1 * | 9/2010 | Fisher | H04M 1/6066 |
| | | | | 348/164 |

(Continued)

*Primary Examiner* — Aaron W Carter

(57) ABSTRACT

A mobile communication device may include one or more cameras located on edges of the mobile communication device. The mobile communication device may further include logic configured to obtain image data from at least one of the one or more cameras; detect a change in an environment of the mobile communication device based on the obtained image data; and provide image data from the at least one of the one or more cameras in a display insert window on a display of the mobile communication device.

18 Claims, 13 Drawing Sheets

(56) References Cited

U.S. PATENT DOCUMENTS

| | | | |
|---|---|---|---|
| 2012/0217764 A1* | 8/2012 | Ishiguro et al. | 296/1.07 |
| 2013/0229261 A1* | 9/2013 | Gates et al. | 340/10.1 |
| 2013/0230178 A1* | 9/2013 | Gates et al. | 381/56 |
| 2013/0231157 A1* | 9/2013 | Chung | H04M 1/0264 455/556.1 |
| 2013/0254874 A1* | 9/2013 | Xu | G06F 21/32 726/17 |
| 2014/0028628 A1* | 1/2014 | Hildreth | G06F 3/017 345/175 |
| 2014/0078164 A1* | 3/2014 | Chan | G09G 5/30 345/589 |
| 2014/0098197 A1* | 4/2014 | Geris | H04N 13/0296 348/48 |
| 2014/0111629 A1* | 4/2014 | Morris et al. | 348/77 |
| 2014/0191873 A1* | 7/2014 | Kreiner et al. | 340/604 |
| 2014/0285666 A1* | 9/2014 | O'Connell et al. | 348/148 |
| 2014/0313377 A1* | 10/2014 | Hampton | H05K 5/0217 348/241 |
| 2015/0094118 A1* | 4/2015 | Rodolico | 455/566 |
| 2015/0139508 A1* | 5/2015 | Ye | G06K 9/00892 382/116 |
| 2015/0172531 A1* | 6/2015 | Ikeda | H04N 5/23206 348/207.11 |

* cited by examiner

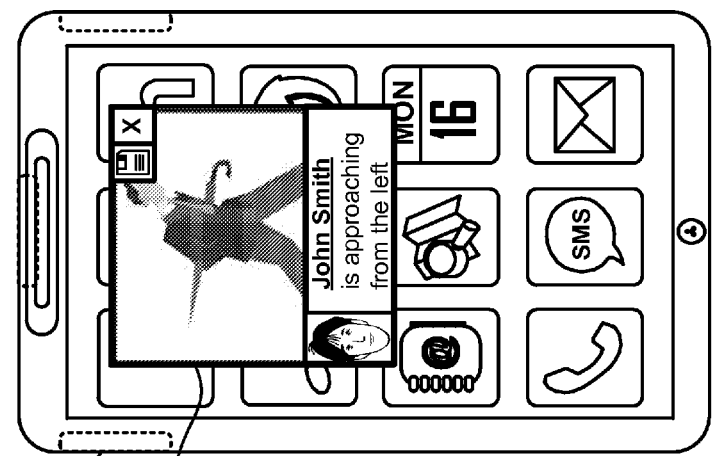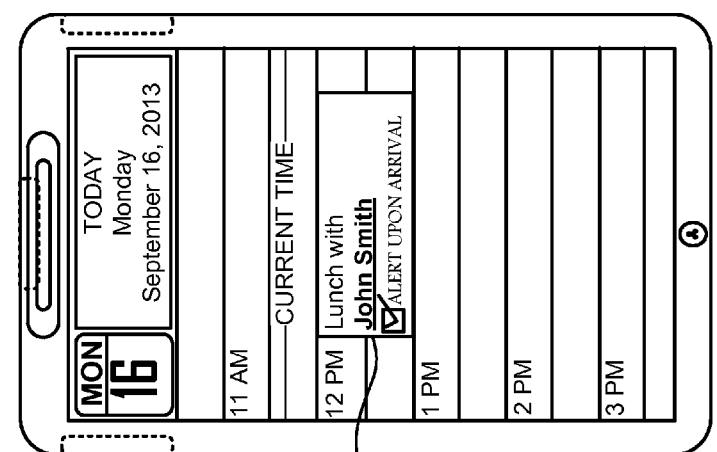
FIG. 12

MOBILE DEVICE EDGE VIEW DISPLAY INSERT

BACKGROUND INFORMATION

Mobile communication devices are used in many situations. For example, a user may use a mobile communication device for sending text messages, browsing the internet, or watching a video. Such activities may require a user to look down on the screen of the mobile communication device. Often, users may have their attention focused on the mobile communication device without being aware of their environment.

BRIEF DESCRIPTION OF THE DRAWINGS

FIG. 12 is a diagram of a third exemplary scenario according to an implementation described herein.

DETAILED DESCRIPTION OF PREFERRED EMBODIMENTS

Figure 1:
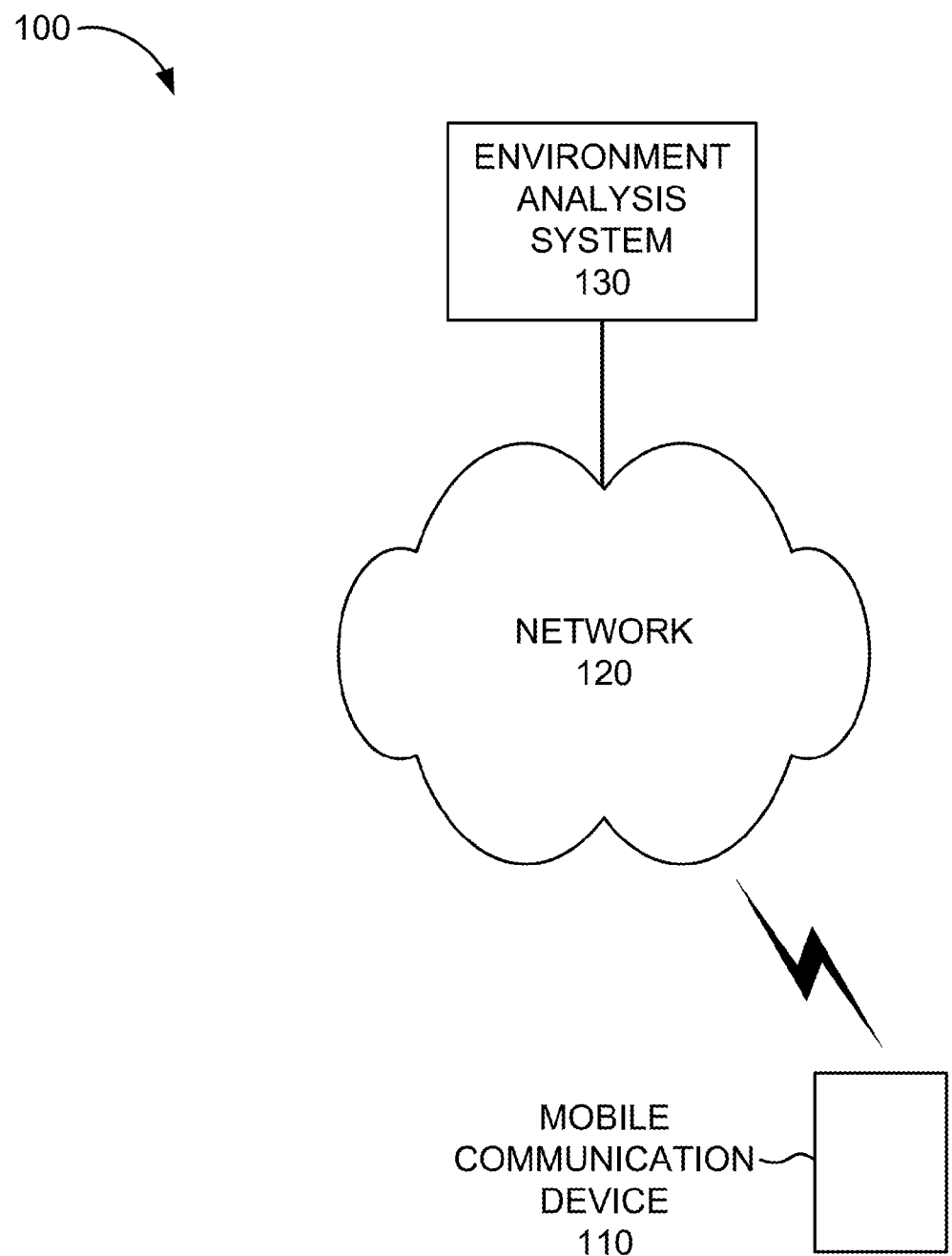
FIG. 1 is a diagram illustrating an exemplary environment according to an implementation described herein.

The following detailed description refers to the accompanying drawings. The same reference numbers in different drawings identify the same or similar elements.

When a user is looking down on the display of a mobile communication device, the user may not be aware of the environment around the user, and may not notice a change in the environment, such as an approaching vehicle or person. Implementations described herein relate to a mobile communication device edge view display insert. The mobile communication device may include one or more edge cameras located on edges of the mobile communication device. An edge may correspond to a plane that is perpendicular in relation to a plane of a display of the mobile communication device. For example, the mobile communication device may include a top edge camera located on a top edge of the mobile communication device. Thus, when the mobile communication device is in a horizontal, or near horizontal, position as the user is looking down on the display, the top edge camera may point forward and may capture a field of view in front of the user. Additionally or alternatively, the mobile communication device may include one or more side edge cameras located on the side edges of the mobile communication device, such as a left edge camera and/or a right edge camera, which may capture a field of view to the user's side.

The mobile communication device may include logic configured to obtain image data from one or more cameras, detect a change in an environment of the mobile communication device based on the obtained image data, generate an alert informing a user of the mobile communication device of the detected change in the environment, and provide image data from at least one of the cameras in a display insert window (e.g., a small pop-up display window) on a display of the mobile communication device. The one or more cameras may include edge cameras located on edges of the mobile communication device and/or a back camera located on the back of the mobile communication device. Particular camera to monitor the environment may be selected based on the orientation of the mobile communication device. Furthermore, in some implementations, the one or more cameras may include a remote camera that communicates with the mobile communication device using a wireless connection, such as a dash mounted camera in a vehicle. Moreover, image data obtained from multiple cameras may be combined to produce a single image or video stream, such as a panoramic view image or video stream.

Image data from the selected one or more cameras may be displayed in a display insert window on a display of the mobile communication device. Thus, the display insert window may provide images and/or a video feed of the environment. The user may select to continuously display the display insert window. Alternatively, the user may select to have the display insert window appear in response to a detected change in the environment.

A change in the environment may be detected by detecting motion, a change in light intensity, and/or a change in a color profile of the environment based on the image data. A change may also be detected from another type of change in the image data or other collected data, such as audio data captured by a microphone. In some implementations, one or more of the cameras may include a zoom lens assembly and the zoom lens assembly may be focused on an area of the environment in which the change is detected.

In some implementations, the mobile communication device may be configured to perform pattern recognition on captured images, to detect a change in the environment. The mobile communication device may identify an object, entity, or event in the environment based on the pattern recognition. For example, the mobile communication device may detect a moving vehicle and may inform the user that the moving vehicle is approaching the user.

As another example, the mobile communication device may detect a person, may perform facial recognition to identify the person, and may retrieve contact information associated with the user based on the identification. The contact information may be obtained from the user's address book, a social media account of the user, and/or another database of contacts. The user may be informed that the person has been identified and/or that the contact information has been obtained. Furthermore, in some implementations a calendar event associated with the contact may be identified and information relating to the calendar event may be provided to the user.

FIG. 1 is a diagram of an exemplary environment 100 in which the systems and/or methods described herein may be implemented. As shown in FIG. 1, environment 100 may include a mobile communication device 110, a network 120, and an environment analysis system 130.

Mobile communication device 110 may include any mobile communication device that includes a display and a camera. For example, mobile communication device 110 may include a portable communication device (e.g., a mobile phone, a smart phone, a phablet device, a global positioning system (GPS) device, and/or another type of wireless device); a personal computer or workstation; a server device; a laptop, tablet, or another type of portable computer; a media playing device; a portable gaming system; and/or any type of mobile device with communication capability. Mobile communication device 110 may include one or more edge cameras located on an edge of the mobile communication device 110 and may be configured to provide a display insert of a scene from the environment based on a detected change in the environment.

Network 120 may enable mobile communication device 110 and environment analysis system 130 to communicate with each other. Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

Environment analysis system 130 may include one or more devices, such as server devices, that analyze the environment of mobile communication device 110 based on images, audio signals, and/or videos obtained by mobile communication device 110. For example, environment analysis system 130 may perform image processing, image/pattern recognition (e.g., facial recognition), contact identification (e.g., identifying a person that is in a contact list of the user), and/or other computationally demanding processes.

Although FIG. 1 shows exemplary components of environment 100, in other implementations, environment 100 may include fewer components, different components, differently arranged components, or additional components than the ones depicted in FIG. 1. Additionally or alternatively, one or more components of environment 100 may perform functions described as being performed by one or more other components of environment 100.

Figure 2:
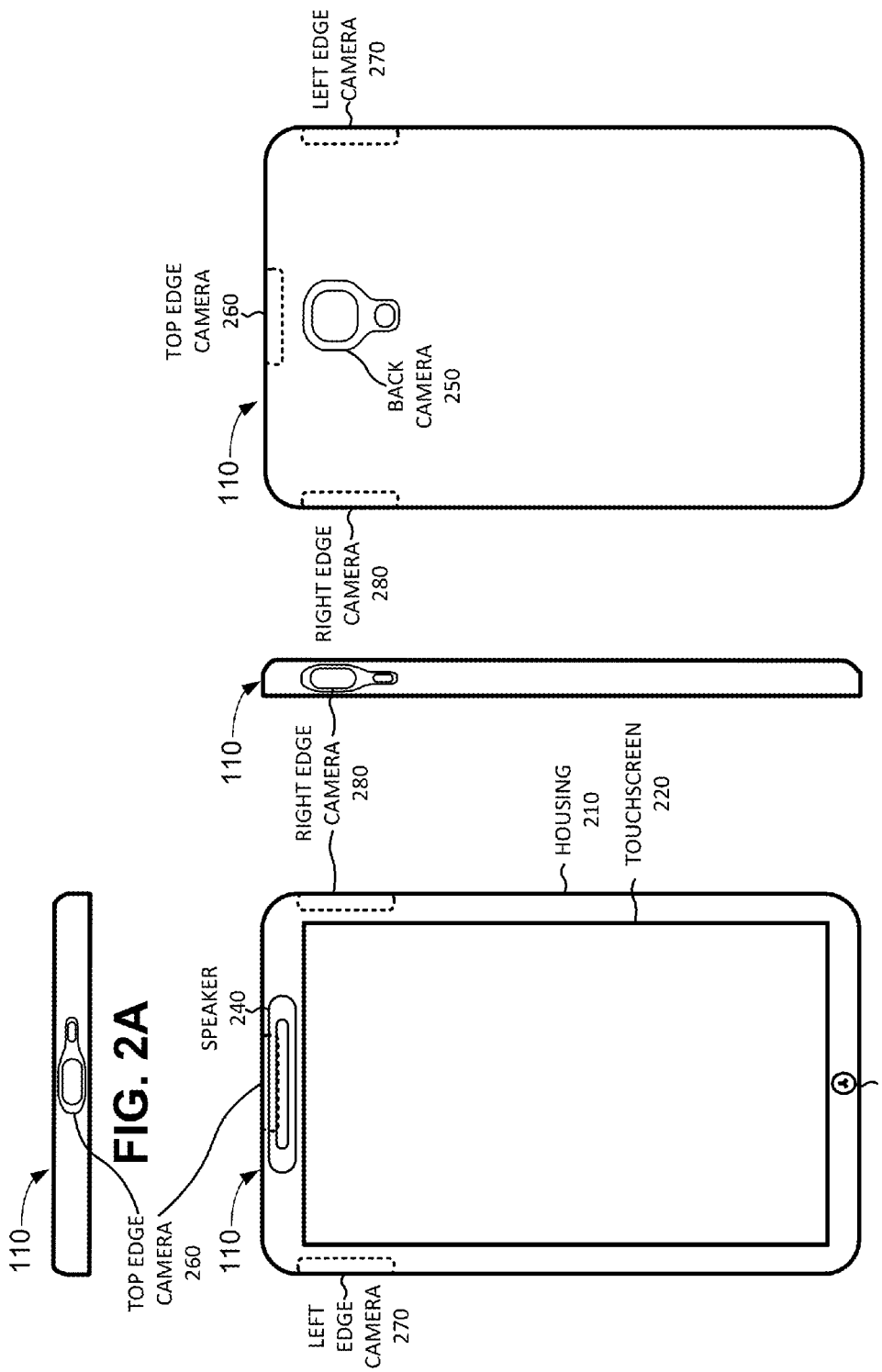
FIGS. 2A-2D are diagrams illustrating exemplary components of the mobile communication device of FIG. 1.

FIGS. 2A-2D are diagrams of an exemplary mobile communication device 110 according to an implementation. FIG. 2A illustrates a top view of mobile communication device 110; FIG. 2B illustrates a front view of mobile communication device 110; FIG. 2C illustrates a side view of mobile communication device 110; and FIG. 2D illustrates a back view of mobile communication device 110. As shown in FIGS. 2A-2D, mobile communication device 110 may include a housing 210, a touchscreen 220, a microphone 230, a speaker 240, a back camera 250, a top edge camera 260, a left edge camera 270, and a right edge camera 280.

Housing 210 may enclose mobile communication device 110 and may protect the components of mobile communication device 110 from the outside elements (e.g., moisture, dirt, etc.). Touchscreen 220 may include a display device and an input device configured to detect a user's touch. While FIGS. 2A-2D illustrate mobile communication device 110 with a touchscreen, in other implementations, mobile communication device 110 may not necessarily include a touchscreen. For example, mobile communication device 110 may include a display and a keyboard and/or keypad. Touchscreen 220 may include a liquid crystal display (LCD), an electronic ink display (e.g., an electrophoretic display), an electroluminescent display, and/or another type of display. Furthermore, touchscreen 220 may include touch sensors, such as capacitive sensors (e.g., surface capacitive sensors, projected capacitive touch sensors, etc.), resistive sensors (e.g., analog resistive sensors, digital resistive sensors, etc.), optical sensors (e.g., optical imaging sensors, rear diffused illumination sensors, infrared grid sensors, diffused surface illumination sensors, etc.), acoustic wave sensors (e.g., surface acoustic wave sensors, bending wave sensors, etc.), and/or another type of touch sensors. Furthermore, touchscreen 220 may include sensors to sense an amount of force being applied to touchscreen 220, such as piezoresistive sensors.

Microphone 230 may receive audio signals and convert the received audio signals to electrical signals for mobile communication device 110. Speaker 240 may receive electrical signals from within mobile communication device 110 and generate audio signals based on the received electrical signals.

Mobile communication device 110 may include additional sensors (not shown in FIGS. 2A-2D). For example, mobile communication device 110 may include one or more tilt sensors, such as accelerometers and/or gyroscopes, configured to sense a tilt, position, and/or orientation of mobile communication device 110 in space; one or more Global Positioning System (GPS) receivers; one or more magnetic field sensors (e.g., to sense the magnetic North); motion detection sensors to sense motion in the vicinity of mobile communication device 110; and/or other types of sensors.

Back camera 250, top edge camera 260, left edge camera 270, and right edge camera 280 (referred to herein collectively as "the cameras") may each include a visible light camera, an infrared light camera, an ultraviolet light camera, and/or another type of camera. Back camera 250 may be located on the back of mobile communication device 110 and may be configured to capture a field of view in front of the user when mobile communication device 110 is held in a vertical position. Top edge camera 260 may be located on the top edge of mobile communication device 110 and may be configured to capture a field of view of in front of the user when mobile communication device 110 is in a horizontal position. Left edge camera 270 may be located on the left edge of mobile communication device 110 and may be configured to capture a field of view to the left of the user. Right edge camera 280 may be located on the right edge of mobile communication device 110 and may be configured to capture a field of view to the right of the user.

In some implementations, at least some of the cameras may include a fisheye camera that includes a wide angle lens, enabling a camera to capture a wide angle image (e.g., a 180 degree view image) of the environment. In some implementations, at least some of the cameras may include a mechanical zoom assembly that enables a particular camera to zoom in on an area in the field of view of the camera.

Although FIGS. 2A-2D show exemplary components of mobile communication device 110, in other implementations, mobile communication device 110 may include fewer components, different components, differently arranged components, or additional components than those depicted in FIGS. 2A-2D. Additionally or alternatively, one or more components of mobile communication device 110 may perform functions described as being performed by one or more other components of mobile communication device 110. As an example, in some implementations, mobile communication device 110 may include top edge camera 260 and may not include left edge camera 270 and right edge camera 280. As another example, in some implementations, mobile communication device 110 may include a camera on the bottom edge of mobile communication device 110. As yet another example, in some implementations, mobile communication device 110 may include multiple cameras along a particular edge.

Figure 3:
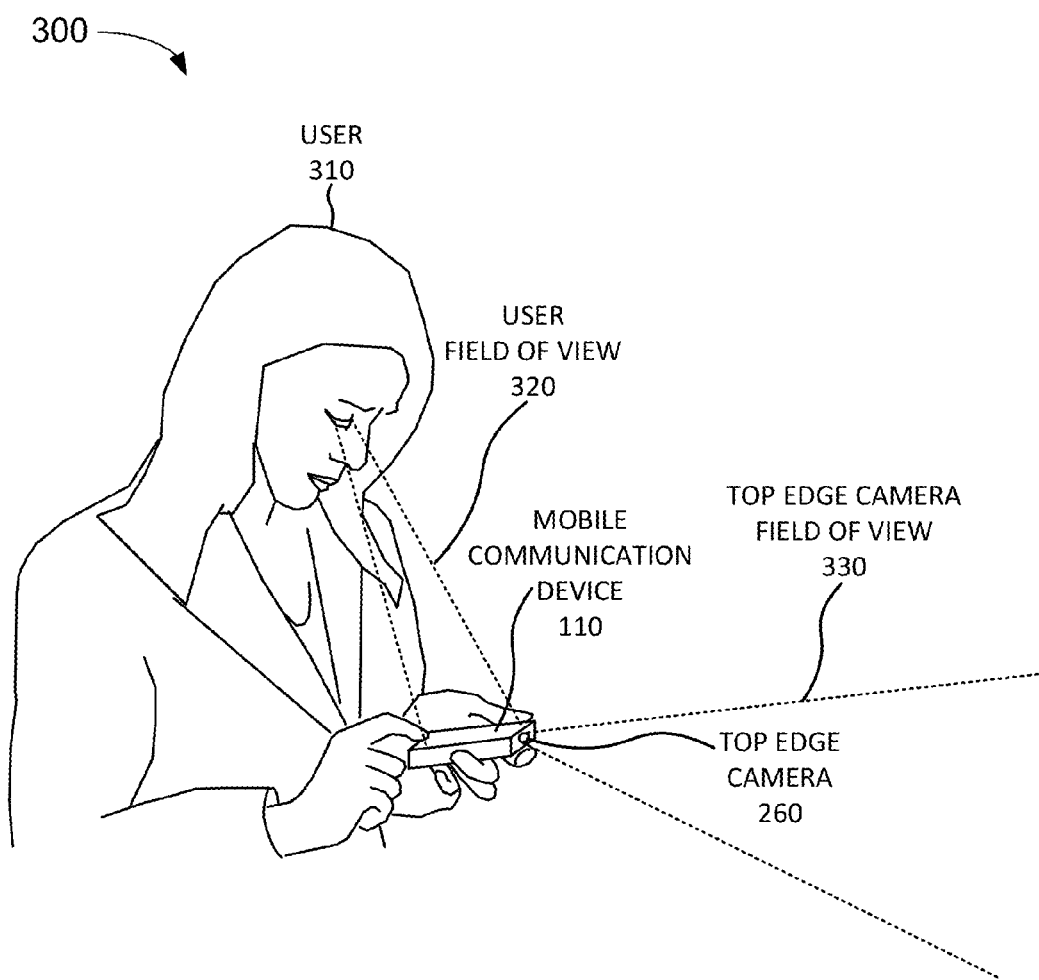
FIG. 3 is a diagram illustrating the field of view of a user and a field of view that may be available to a mobile communication device of the user.

FIG. 3 is a diagram of a user with a mobile communication device 110. FIG. 3 illustrates the field of view of the user and a field of view that may be available to mobile communication device 110. As shown in FIG. 3, when user 310 is holding mobile communication device 110 in a horizontal position, the top edge of mobile communication device 110 is pointing to the environment in front of user 310. Thus, while the user's field of view 320 is directed to the screen of mobile communication device 110, top edge camera 260 may be pointed forward. Thus, an image of the environment in front of the user is within field of view 330 of top edge camera 260, allowing top edge camera 260 to capture the image.

Figure 4:
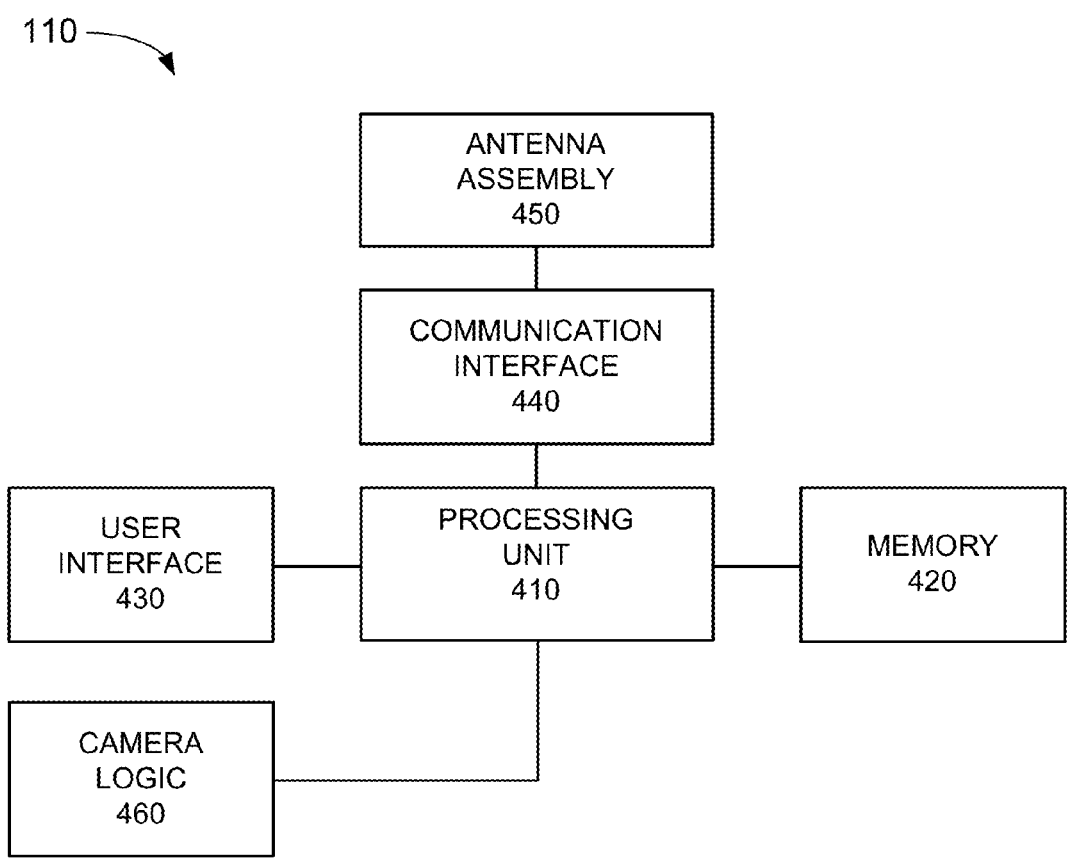
FIG. 4 is a diagram of exemplary components of the mobile communication device of FIG. 1.

FIG. 4 is a diagram illustrating example components of a mobile communication device 110 according to an implementation described herein. As shown in FIG. 4, mobile communication device 110 may include a processing unit 410, a memory 420, a user interface 430, a communication interface 440, an antenna assembly 450, and camera logic 460.

Processing unit 410 may include one or more processors, microprocessors, application specific integrated circuits (ASICs), field programmable gate arrays (FPGAs), and/or other processing logic. Processing unit 410 may control operation of mobile communication device 110 and its components.

Memory 420 may include a random access memory (RAM) or another type of dynamic storage device, a read only memory (ROM) or another type of static storage device, a removable memory card, and/or another type of memory to store data and instructions that may be used by processing unit 410.

User interface 430 may allow a user to input information to mobile communication device 110 and/or to output information from mobile communication device 110. Examples of user interface 430 may include a speaker to receive electrical signals and output audio signals (e.g., speaker 240); a camera to receive image and/or video signals and output electrical signals; a microphone to receive sounds and output electrical signals (e.g., microphone 230); buttons (e.g., a joystick, control buttons, a keyboard, or keys of a keypad) and/or a touchscreen to receive control commands (e.g., touchscreen 220); a display, such as an LCD, to output visual information (e.g., touchscreen 220); an actuator to cause mobile communication device 110 to vibrate; and/or any other type of input or output device.

Communication interface 440 may include a transceiver that enables mobile communication device 110 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 440 may include a transmitter that converts baseband signals to radio frequency (RF) signals and/or a receiver that converts RF signals to baseband signals. Communication interface 440 may be coupled to antenna assembly 450 for transmitting and receiving RF signals.

Communication interface 440 may include a logical component that includes input and/or output ports, input and/or output systems, and/or other input and output components that facilitate the transmission of data to other devices. For example, communication interface 440 may include a network interface card (e.g., Ethernet card) for wired communications and/or a wireless network interface (e.g., a WiFi) card for wireless communications. Communication interface 440 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 450 may include one or more antennas to transmit and/or receive RF signals. Antenna assembly 450 may, for example, receive RF signals from communication interface 440 and transmit the signals and receive RF signals and provide them to communication interface 440. Camera logic 460 may control the cameras of mobile communication device 110. For example, camera logic 460 may control the operation of cameras to capture images of the environment. For example, camera logic 460 may control a mechanical zoom assembly of a particular camera. In some implementations, one or more of the edge cameras may include a tilt motor for moving the focus of an edge camera in relation to the plane of mobile communication device 110 and camera logic 460 may be configured to control the tilt motor. For example, if mobile communication device 110 is held by the user at a 45 degree angle, camera logic may control the tilt motor to adjust top edge camera 260 to point straight ahead in a horizontal direction.

As described herein, mobile communication device 110 may perform certain operations in response to processing unit 410 executing software instructions contained in a computer-readable medium, such as memory 420. A computer-readable medium may be defined as a non-transitory memory device. A non-transitory memory device may include memory space within a single physical memory device or spread across multiple physical memory devices. The software instructions may be read into memory 420 from another computer-readable medium or from another device via communication interface 440. The software instructions contained in memory 420 may cause processing unit 410 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 4 shows example components of mobile communication device 110, in other implementations, mobile communication device 110 may include fewer components, different components, differently arranged components, or additional components than depicted in FIG. 4. Additionally or alternatively, one or more components of mobile communication device 110 may perform the tasks described as being performed by one or more other components of mobile communication device 110.

Figure 5:
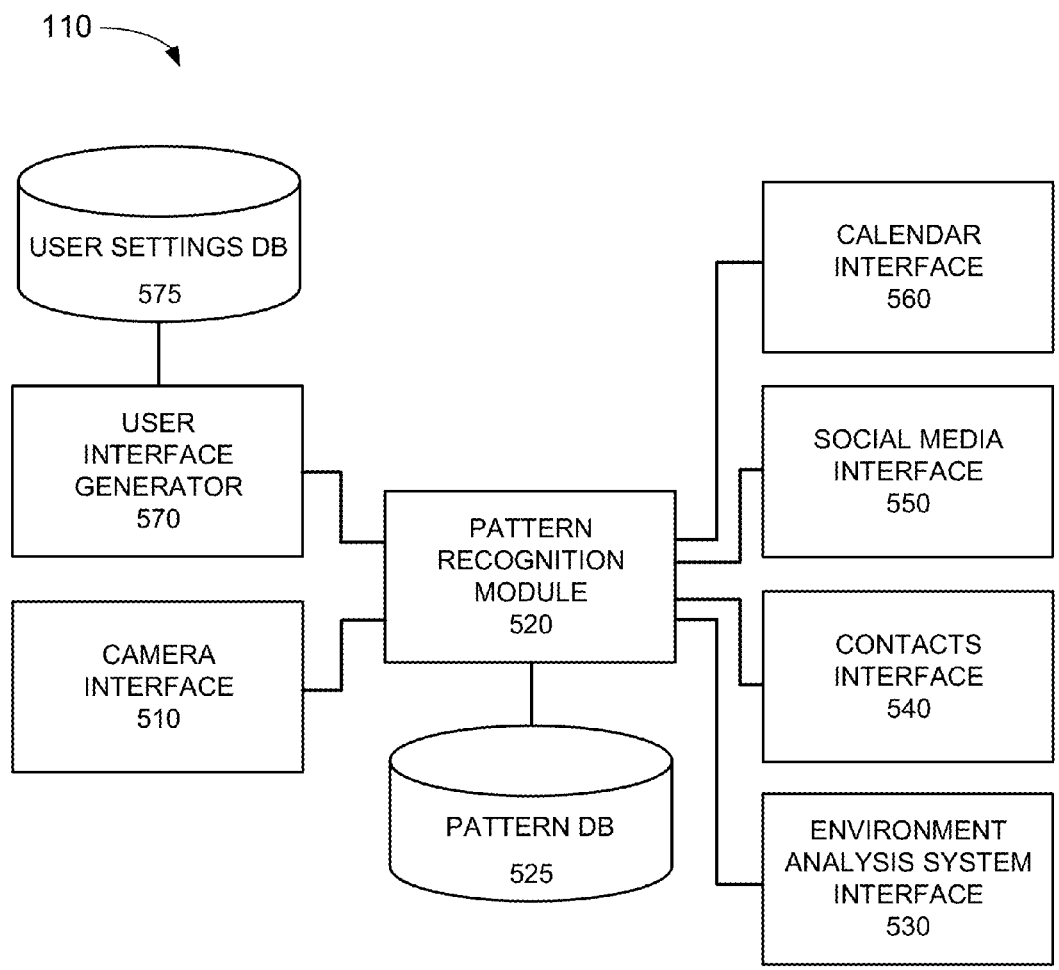
FIG. 5 is a diagram of exemplary functional components of the mobile communication device of FIG. 1.

FIG. 5 is a diagram illustrating exemplary functional components of mobile communication device 110 according to an implementation described herein. The functional components of mobile communication device 110 may be implemented, for example, via processing unit 410 executing instructions from memory 420. For example, the functional components of FIG. 5 may be implemented in an application installed on mobile communication device 110. Alternatively, some or all of the functional components of mobile communication device 110 may be implemented via hardwired circuitry. As shown in FIG. 5, mobile communication device 110 may include a camera interface 510, a pattern recognition module 520, a pattern database (DB) 525, an environment analysis system interface 530, a contacts interface 540, a social media interface 550, a calendar interface 560, a user interface generator 570, and a user settings DB 575.

Camera interface 510 may communicate with, and control, camera logic 460. Camera interface 510 may determine an orientation of mobile communication device 110 in space and may select one or more of the cameras to monitor the environment, based on the determined orientation. In some implementations, camera interface 510 may combine images from multiple cameras into a single image or video feed, such as a panoramic image or video feed. Furthermore, camera interface 510 may establish a wireless connection with a remote camera, such as a nearby camera detected with a Bluetooth or NFC connection, or a remote camera which the user has configured to provide images and/or video feeds to mobile communication device 110 (e.g., a home surveillance camera).

Pattern recognition module 520 may analyze images and/or video feeds from the cameras to determine a change in the environment. For example, pattern recognition module 520 may detect movement in the environment based on the images, may detect a change in light intensity in the environment based on the images, may detecting a change in a color profile of the environment based on the images, may detect a change in the environment based on audio signals obtained via microphone 230, and/or may detect a change in the environment based on another type of sensor data.

Furthermore, pattern recognition module 520 may analyze the images to identify a particular pattern. Pattern recognition module 520 may apply image processing techniques, such as edge detection, object detection, color histogram analysis, light intensity analysis, and/or other techniques and may generate one or more feature vectors for a particular image. The feature vectors may be used to identify a particular pattern in the image based on information stored in patterns DB 525.

Pattern DB 525 may store particular patterns and corresponding information that may be provided to the user. As an example, pattern DB 525 may store a pattern associated with a particular type of vehicle in connection with information relating to the type of vehicle. As another example, pattern DB 525 may store a pattern associated with a person performing a particular activity along with information relating to the particular activity. As yet other examples, pattern DB 525 may store a pattern associated with a particular level of traffic congestion or speed of movement, a pattern associated with a particular street sign (e.g., traffic light, walk sign, etc.), a pattern associated with a particular number of people, and/or another type of pattern.

Environment analysis system interface 530 may communicate with environment analysis system 130. For example, in some implementations, environment analysis system interface 530 may provide image and/or video feed data, and/or information extracted from the image and/or video feed data, to environment analysis system 130 for analysis. Environment analysis system 130 may perform computationally intensive operations, such as image processing, facial recognition etc. Environment analysis system interface 530 may receive information from environment analysis system 130, such as results of the analysis.

Contacts interface 540 may interface with a contacts management application and/or contacts database on mobile communication device 540 and may identify contact information (herein referred to as "a contact") associated with a person that may be identified in images and/or video feeds obtained by the cameras. Social media interface 550 may interface with a social media application account associated with the user, may identify a contact associated with the user's social media account, and may obtain information relating to the identified contact from a social media application and/or social media system. Calendar interface 560 may interface with a calendar application on mobile communication device 110 and may determine whether a calendar event is associated with a particular contact that has been identified via an image or video feed obtained from the cameras.

User interface generator 570 may generate a user interface that includes a display insert window in response to a detected change in the environment and/or in response to the user selecting to open a display insert window that includes an image or video feed from a particular camera of mobile communication device 110 or from a remote camera. Furthermore, user interface generator 570 may generate an audible alert, a vibration alert, and/or another type of alert in response to the detected change in the environment. Moreover, user interface generator 570 may provide information relating to the detected change. The information may have been obtained based on patter analysis, such as information identifying a particular entity, object, or event in the environment.

User settings DB 575 may store settings selected by the user. The settings may indicate, for example, what type of detected changes in the environment should trigger an alert, what kind of alert to provide to the user, whether the user has selected to check whether a particular contact has been detected, etc.

Although FIG. 5 shows exemplary functional components of mobile communication device 110, in other implementations, mobile communication device 110 may include fewer functional components, different functional components, differently arranged functional components, or additional functional components than depicted in FIG. 5. Additionally or alternatively, one or more functional components of mobile communication device 110 may perform functions described as being performed by one or more other functional components of mobile communication device 110.

Figure 6:
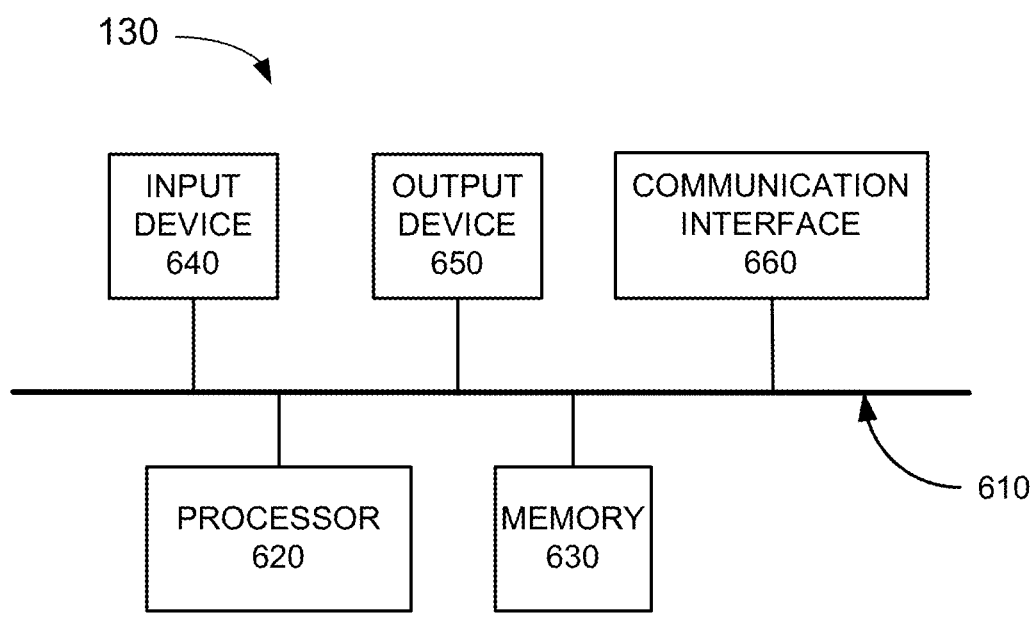
FIG. 6 is a diagram of exemplary components of the environment analysis system of FIG. 1.

FIG. 6 is a diagram illustrating exemplary components of environment analysis system 130 according to an implementation described herein. As shown in FIG. 6, environment analysis system 130 may include a bus 610, a processor 620, a memory 630, an input device 640, an output device 650, and a communication interface 660.

Bus 610 may include a path that permits communication among the components of environment analysis system 130. Processor 620 may include any type of single-core processor, multi-core processor, microprocessor, latch-based processor, and/or processing logic (or families of processors, microprocessors, and/or processing logics) that interprets and executes instructions. In other embodiments, processor 620 may include an application-specific integrated circuit (ASIC), a field-programmable gate array (FPGA), and/or another type of integrated circuit or processing logic.

Memory 630 may include any type of dynamic storage device that may store information and/or instructions, for execution by processor 620, and/or any type of non-volatile storage device that may store information for use by processor 620. For example, memory 630 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 640 may allow an operator to input information into environment analysis system 130. Input device 640 may include, for example, a keyboard, a mouse, a pen, a microphone, a remote control, an audio capture device, an image and/or video capture device, a touch-screen display, and/or another type of input device. In some embodiments, environment analysis system 130 may be managed remotely and may not include input device 640. In other words, environment analysis system 130 may be "headless" and may not include a keyboard, for example.

Output device 650 may output information to an operator of environment analysis system 130. Output device 650 may include a display, a printer, a speaker, and/or another type of output device. For example, environment analysis system 130 may include a display, which may include a liquid-crystal display (LCD) for displaying content to the customer. In some embodiments, environment analysis system 130 may be managed remotely and may not include output device 650. In other words, environment analysis system 130 may be "headless" and may not include a display, for example.

Communication interface 660 may include a transceiver that enables environment analysis system 130 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 660 may include a transmitter that converts baseband signals to radio frequency (RF) signals and/or a receiver that converts RF signals to baseband signals. Communication interface 660 may be coupled to an antenna for transmitting and receiving RF signals.

Communication interface 660 may include a logical component that includes input and/or output ports, input and/or output systems, and/or other input and output components that facilitate the transmission of data to other devices. For example, communication interface 660 may include a network interface card (e.g., Ethernet card) for wired communications and/or a wireless network interface (e.g., a WiFi) card for wireless communications. Communication interface 660 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, environment analysis system 130 may perform certain operations relating to analysis of the environment of mobile communication device 110 based on one or more images, audio signals, and/or videos obtained by mobile communication device 110. Environment analysis system 130 may perform these operations in response to processor 620 executing software instructions contained in a computer-readable medium, such as memory 630. A computer-readable medium may be defined as a non-transitory memory device. A memory device may be implemented within a single physical memory device or spread across multiple physical memory devices. The software instructions may be read into memory 630 from another computer-readable medium or from another device. The software instructions contained in memory 630 may cause processor 620 to perform processes described herein. Alternatively, hardwired circuitry may be used in place of, or in combination with, software instructions to implement processes described herein. Thus, implementations described herein are not limited to any specific combination of hardware circuitry and software.

Although FIG. 6 shows exemplary components of environment analysis system 130, in other implementations, environment analysis system 130 may include fewer components, different components, additional components, or differently arranged components than depicted in FIG. 6. Additionally or alternatively, one or more components of environment analysis system 130 may perform one or more tasks described as being performed by one or more other components of environment analysis system 130.

Figure 7:
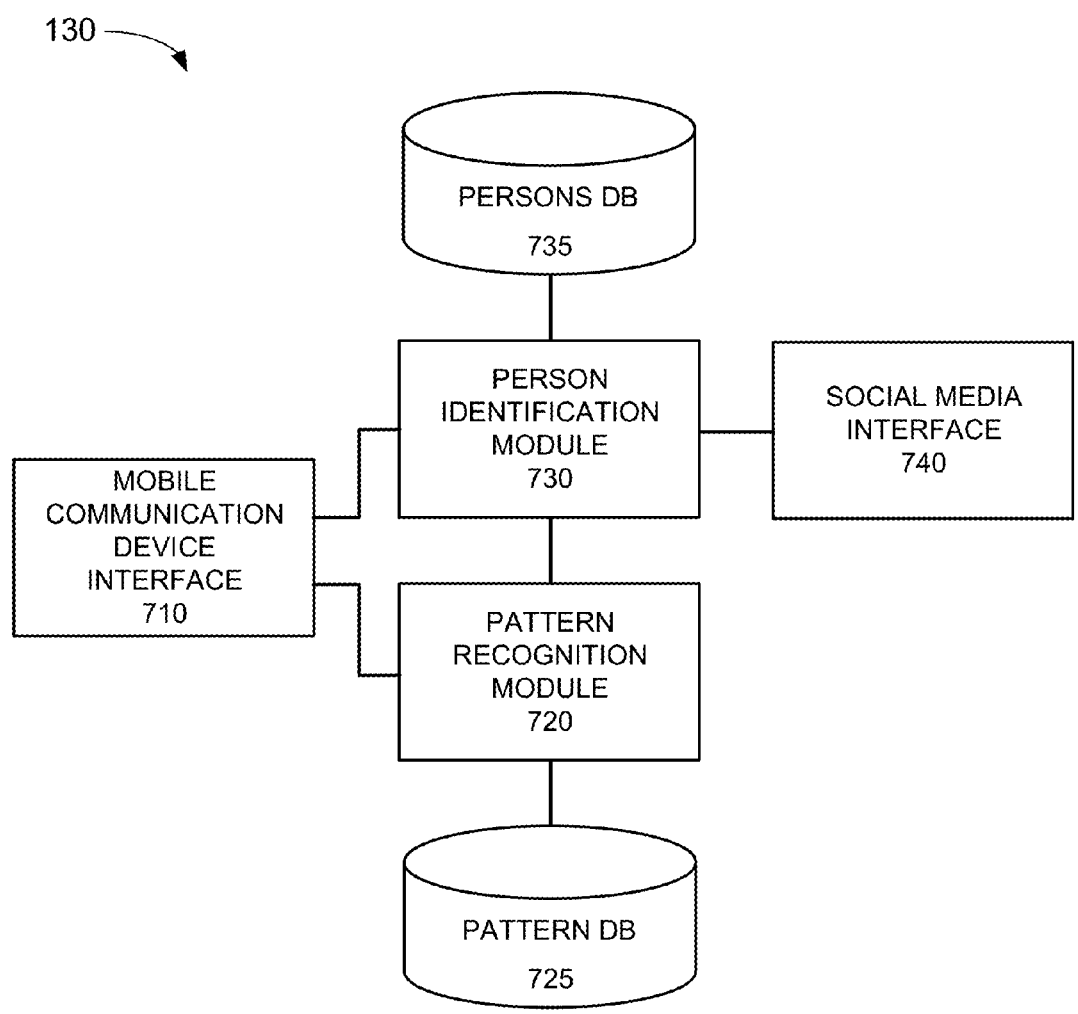
FIG. 7 is a diagram of exemplary functional components of the environment analysis system of FIG. 1.

FIG. 7 is a diagram illustrating exemplary functional components of environment analysis system 130. The functional components of environment analysis system 130 may be implemented, for example, via processor 620 executing instructions from memory 630. Additionally or alternatively, some or all of the functional components of environment analysis system 130 may be hard-wired. As shown in FIG. 7, environment analysis system 130 may include a mobile communication interface 710, a pattern recognition module 720, a pattern DB 725, a user identification module 730, a user DB 735, and a social media interface 740.

Mobile communication interface 710 may communicate with mobile communication device 110. For example, mobile communication interface 710 may obtain image and/or video feed data, and/or information extracted from image and/or video feed data, from mobile communication device 110 and may return information relating to the obtained data and/or generated as a result of analysis performed by environment analysis system 130, to mobile communication device 110.

Pattern recognition module 720 may analyze data obtained from mobile communication device 110 to identify one or more patterns, similar to the functions described above with respect to pattern recognition module 520, and may obtain information relating to the identified patterns from patterns DB 725. Pattern DB 725 may store particular patterns and corresponding information that may be provided to a user of mobile communication device 110. For example, pattern DB 725 may store information similar to the information described above with respect to pattern DB 525.

Person identification module 730 may identify a particular person in an image and/or video feed obtained from mobile communication device 110. For example, person identification module 730 may perform facial recognition analysis on an obtained image, may generate a facial recognition feature vector, may identify a particular person in the image based on the facial recognition feature vector and based on information stored in person DB 735, and may provide information from person DB 735 to mobile communication device 110.

Person DB 735 may store information identifying particular persons. For example, person DB 735 may store a mobile device identifier associated with a person, information identifying the particular person, a social media account associated with the person, contacts associated with the person, a picture of the person, a facial recognition feature vector, privacy settings selected by the person, and/or other information associated with the person. Information stored in person DB 735 about a particular person may be obtained with the particular person's permission and in accordance with privacy laws and regulations. Social media interface 740 may interface with one or more social media systems and may obtain information relating to a particular social media account associated with a user and/or with a social media account associated with a user's contact.

Although FIG. 7 shows exemplary functional components of environment analysis system 130, in other implementations, environment analysis system 130 may include fewer functional components, different functional components, differently arranged functional components, or additional functional components than depicted in FIG. 7. Additionally or alternatively, one or more functional components of environment analysis system 130 may perform functions described as being performed by one or more other functional components of environment analysis system 130.

Figure 8:
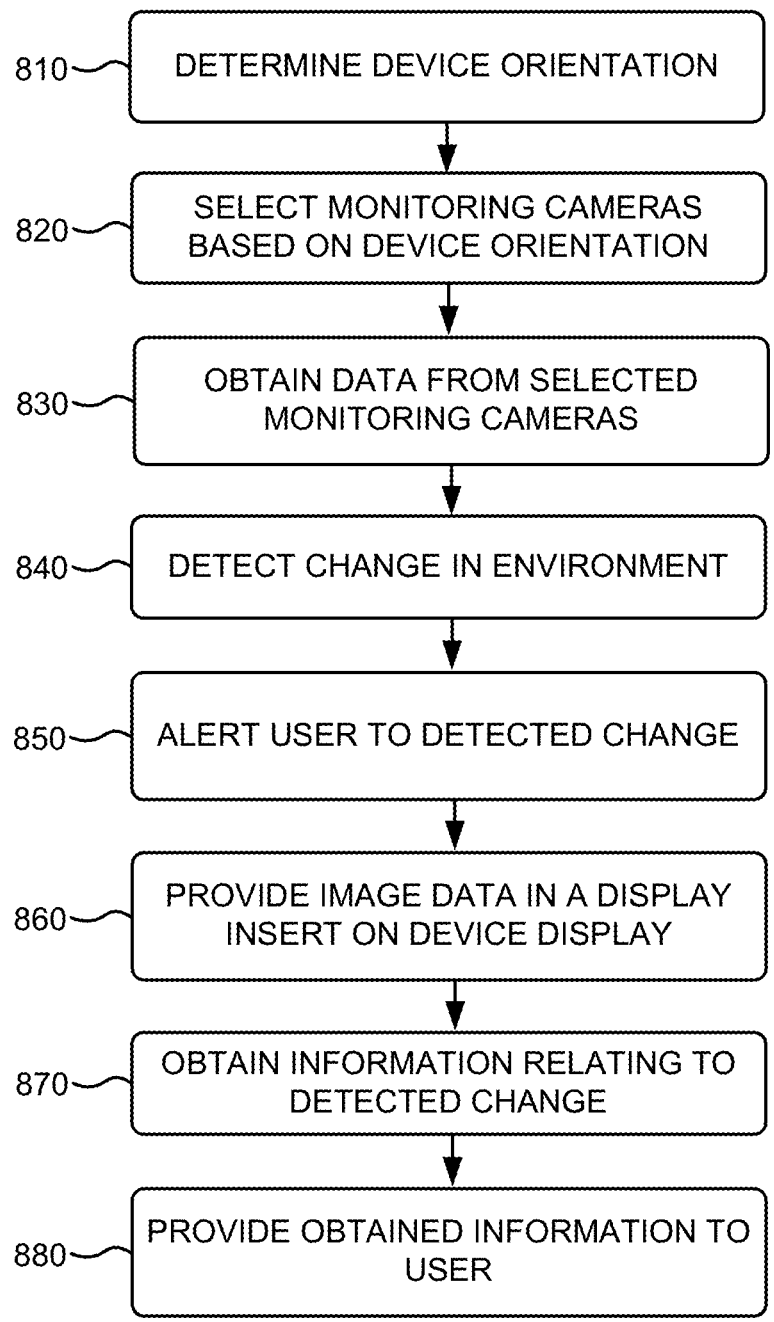
FIG. 8 is a flowchart for providing a display insert based on one or more edge view cameras according to an implementation described herein.

FIG. 8 is a flowchart for providing a display insert based on one or more edge view cameras according to an implementation described herein. In one implementation, the process of FIG. 8 may be performed by mobile communication device 110. In other implementations, some or all of the process of FIG. 8 may be performed by another device or a group of devices separate from and/or including mobile communication device 110, such as environment analysis system 130.

The process of FIG. 8 may include determining a device orientation (block 810). For example, camera interface 510 may determine the orientation of mobile communication device using one or more tilt sensors, such as gyroscope sensors, accelerometers, and/or other types of sensors. Monitoring cameras may be selected based on the device orientation (block 820). For example, if mobile communication device 110 is in a horizontal position (or within a particular number of degrees of a horizontal position) and held in portrait mode, top edge camera 260 may be used to monitor the environment in front of the user and left edge camera 270 and right edge camera 280 may be used to monitor the environment to the left and right of the user. If mobile communication device 110 is in a horizontal position (or within a particular number of degrees of a horizontal position) and held in a landscape mode, either left edge camera 270 or right edge camera 280 may be used to monitor the environment in from of the user. If mobile communication device 110 is in a vertical position (or within a particular number of degrees of a horizontal position), back camera 250 may be used to monitor the environment in from of the user. Furthermore, if one or more of the edge cameras include a tilt motor, camera logic 460 may adjust the tilt of an edge camera based on a determined tilt of mobile communication device 110.

Data from the selected cameras may be obtained (block 830) and a change in the environment may be detected (block 840). For example, camera interface 510 and/or pattern recognition module 520 may monitor images and/or video feeds from one or more of the selected camera to detect for changes in the environment. A change in the environment may be detected if an amount of motion, greater than a motion threshold, is detected. Motion may be detected using a motion detection sensor and/or based on analyzing a series of sequential captured imaged. A change in the environment may be detected if a change in light intensity is detected. For example, pattern recognition module 520 may calculate one or more light intensity values for captured images or for particular areas of captured images and may determine whether a light intensity value has changed over multiple captured images by an amount greater than a light intensity change threshold. A change in the environment may be detected if a change in a color profile is detected. For example, pattern recognition module 520 may calculate one or more color profile values for captured images or for particular areas of captured images and may determine whether a color profile value has changed over multiple captured images by an amount greater than a color profile change threshold. As an example, a street crossing sign may light up and change color and an alert may be generated for the user to inform the user that the sign has changed and that the user can now cross the street. A change in the environment may also be detected based on a detected audio signal captured by microphone 230. In some implementations, camera logic 460 may control a mechanical zoom assembly to zoom in on a part of the environment associated with the detected change.

A user may be alerted to the detected change (block 850) and image data may be provided in a display insert on a device display (block 860). For example, user interface generator 570 may provide a visual, auditory, and/or vibration alert to the user in response to the detected change. Whether or not an alert is generated may depend on the user setting stored in user settings DB 575. User interface generator 570 may generate a display insert window that may appear on touchscreen 220 and captured images and/or a video feed from a particular camera may be displayed in the generated display insert window. Alternatively, a user may select that a display insert window be continuously displayed to provide image data from the one or more selected monitoring cameras without requiring any detected changes in the environment.

Information relating to the detected change may be obtained (block 870) and the obtained information may be provided to the user (block 880). For example, pattern analysis may be performed on one or more captured images to identify an entity, object or event in the environment. In some implementations, the pattern analysis may be performed by mobile communication device 110. In other implementations, the pattern analysis may be performed by environment analysis system 130. In yet other implementations, some of the pattern analysis may be performed by mobile communication system 110 and some of the pattern analysis may be performed by environment analysis system 130. For example, mobile communication device 110 may perform feature extraction on captured images and may provide feature vectors obtained from the captured images to environment analysis system 130. Environment analysis system 110 may classify a feature vector as belonging to a particular class associated with a particular pattern. As another example, mobile communication device 110 may perform pattern analysis to detect a person in a captured image and may send the captured image to environment analysis system 130 to perform facial recognition analysis on the detected person.

Whether particular aspects of the pattern analysis are performed by mobile communication device 110 or environment analysis system 130 may depend upon one or more of an availability of a network connection, a bandwidth capacity of a network connection, a type of subscription associated with mobile communication device 110, a processing load associated with processing unit 410, and/or other factors.

The performed pattern recognition may be used retrieve information relating to an identified object, entity, or event and information relating to the identified object, entity, or event may be provided to the user in connection with the generated display insert window. As an example, the information may be provided in a caption displayed above or below the display insert window. As another example, the information may be provided as an audible message via microphone 230. As yet another example, the information may be provided as a hyperlink.

Figure 9:
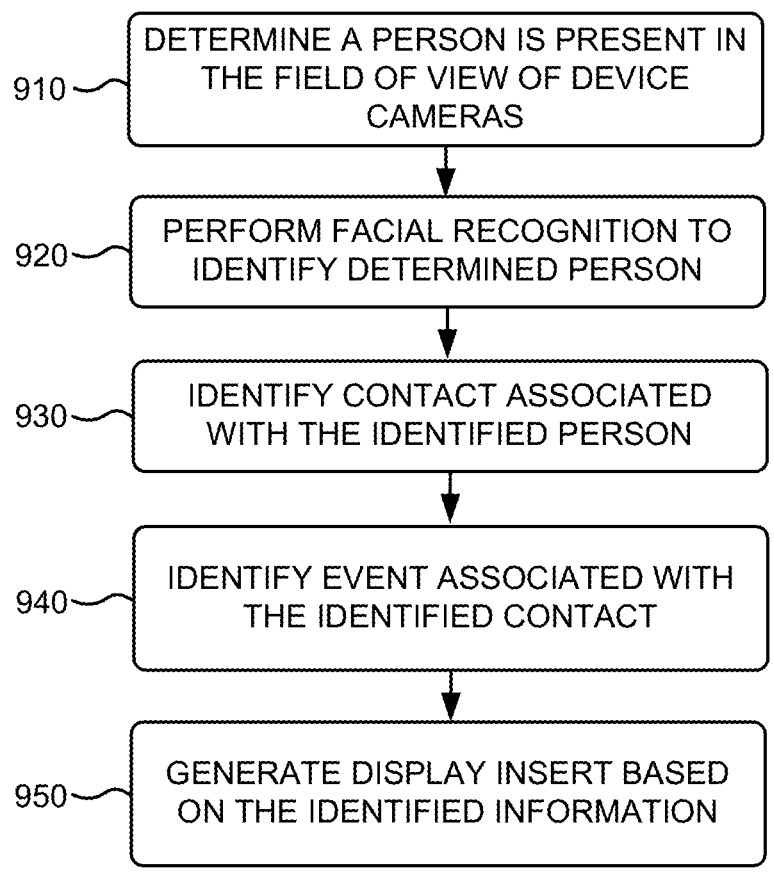
FIG. 9 is a flowchart for relating images from one or more edge view cameras to user contacts according to an implementation described herein.

FIG. 9 is a flowchart for relating images from one or more edge view cameras to user contacts according to an implementation described herein. In one implementation, the process of FIG. 9 may be performed by mobile communication device 110. In other implementations, some or all of the process of FIG. 9 may be performed by another device or a group of devices separate from and/or including mobile communication device 110, such as environment analysis system 130.

The process of FIG. 9 may include determining/detecting whether a person is present in the field of view of the device cameras (block 910). For example, pattern recognition module 520 may detect a person present in a captured image and may provide the captured image to environment analysis system 130 for facial recognition analysis. In other implementations, the facial recognition analysis may be performed by mobile communication device 110.

Facial recognition may be performed to identify the determined/detected person (block 920) and a contact associated with the identified person may be identified (block 930). As an example, mobile communication device 110 may determine whether the detected person corresponds to a contact associated with the user, based on pictures of contacts stored in the user's contacts database. As yet another example, mobile communication device 110 may determine whether the detected person matches a contact based on pictures of contacts associated with a user's social media account. As yet another example, environment analysis system 130 may identify the contact based on pictures and/or facial recognition feature vectors stored in user DB 735.

An event associated with the identified contact may be identified (block 940). For example, in some implementations, pattern recognition module 520 may interface with a calendar application to identify a calendar event associated with the contact and may generate a reminder relating to the calendar event in connection with the identified contact.

A display insert may be generated based on the identified information (block 950). For example, user interface generator 570 may generate a display insert window that provides a video feed of the approaching person, along with a message, informing the user that the identified contact is approaching.

Figure 10:
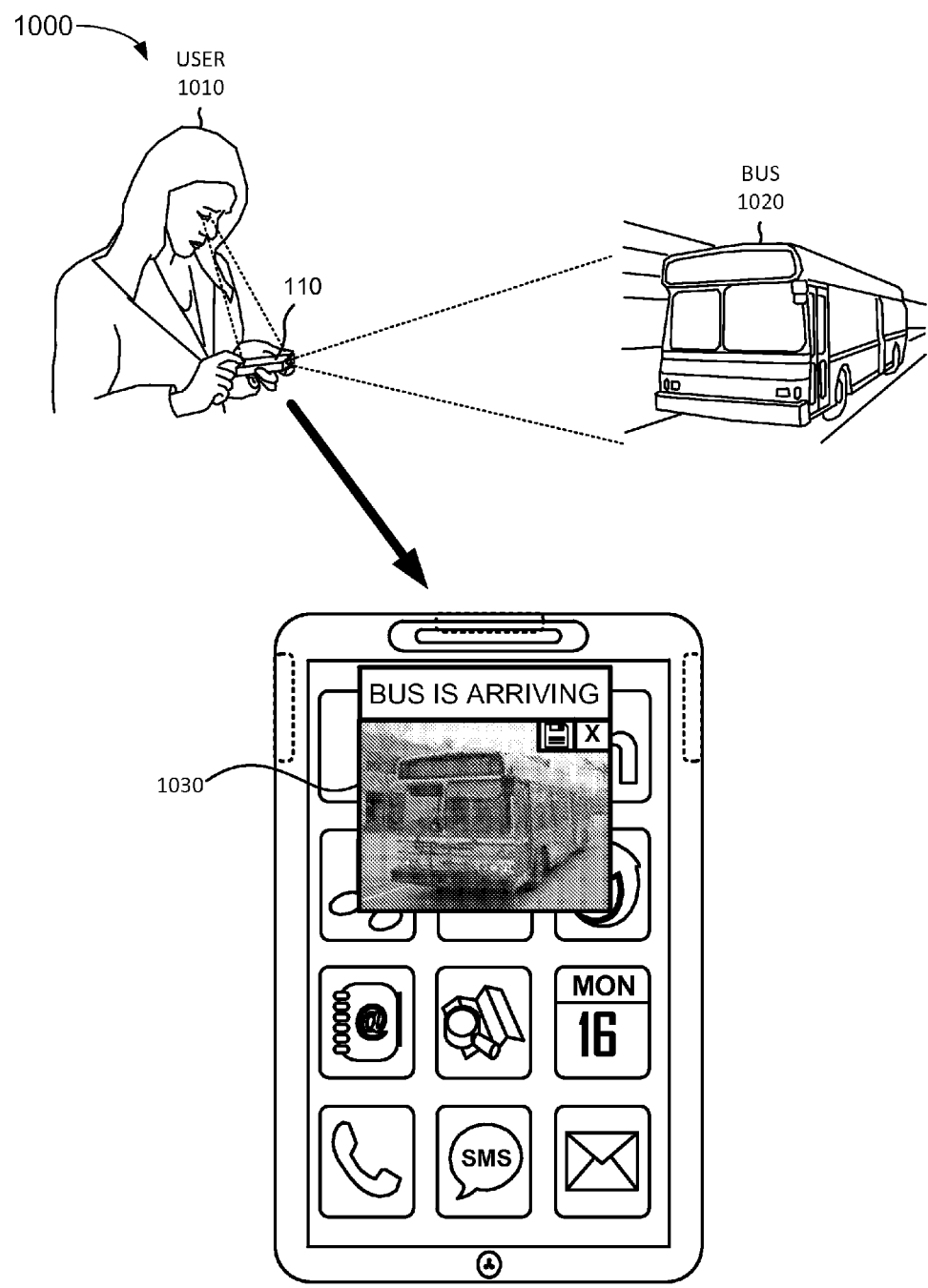
FIG. 10 is a diagram of a first exemplary scenario according to an implementation described herein.

FIG. 10 is a diagram of a first exemplary scenario 1000 according to an implementation described herein. In scenario 1000, user 1010 is looking down at mobile communication device 110 while waiting for a bus. Since mobile communication device 110 is in a horizontal position, top edge camera 260 may be selected for monitoring the environment and images captures by top edge camera 260 may be monitored for changes by camera interface 510. When bus 1020 arrives, camera interface 510 may detect motion and may, in response to detecting the motion, generate a display insert 1030 with a video feed of images captured by top edge camera 260. Additionally, pattern recognition module 520 may analyze the video images and may detect a large moving object, which may be identified as a bus based on pattern information stored in pattern DB 525. Thus, user interface generator 570 may generate a textual and/or audible message, informing the user that a bus is arriving.

While display insert 1030 is shown in FIG. 10 as appearing on top of application icons and/or types of selection objects (e.g., buttons, links, etc.), in other implementations, display insert 1030 may appear behind the application icons and/or other types of selection objects. For example, display insert 1030 may appear as a background image on the display of mobile communication device 110. In yet other implementations, display insert 1030 may be moved by the user by sliding display insert 1030 to a different location in order to access application icons and/or other types of selection objects that are covered by display insert 1030.

Figure 11:
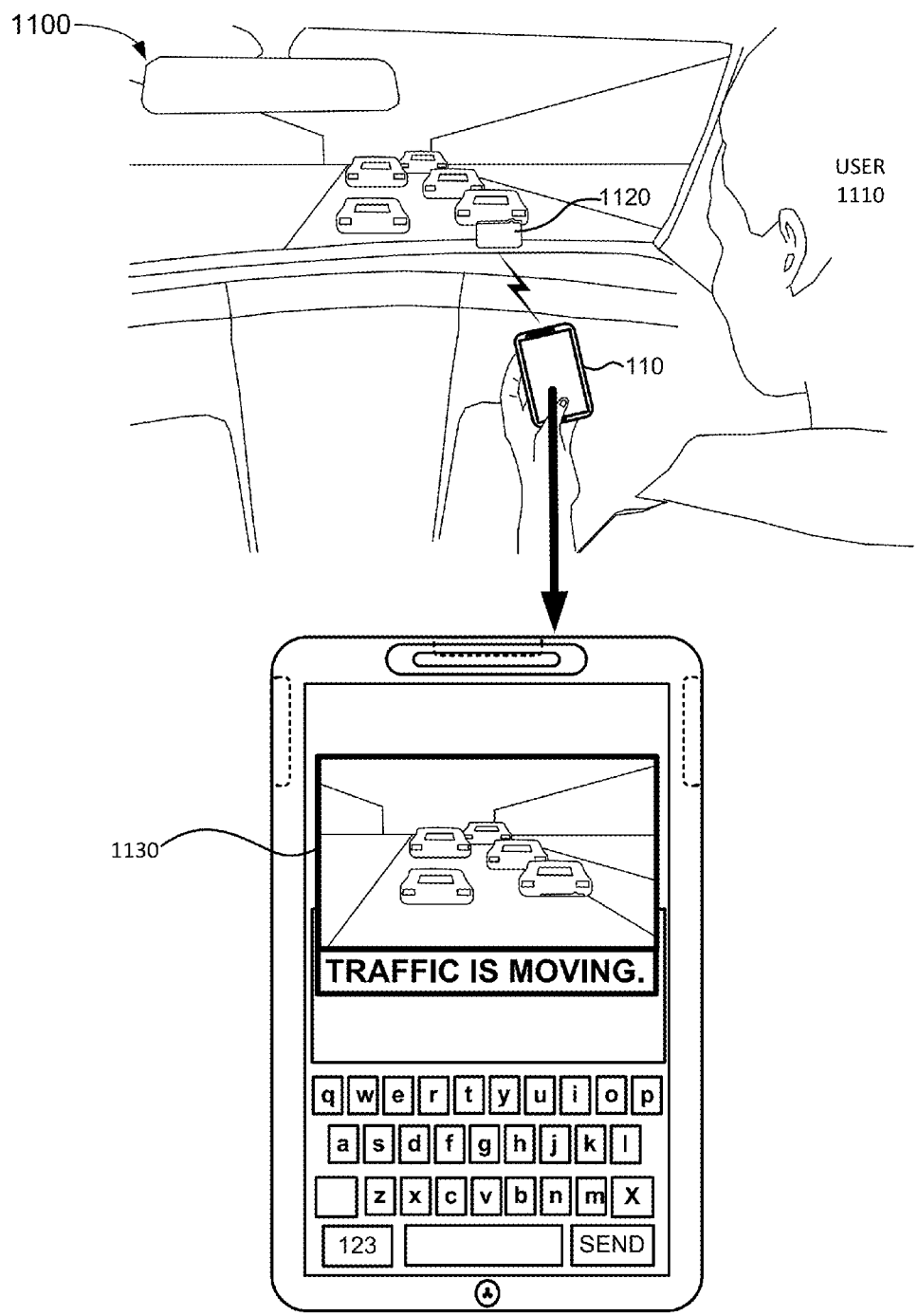
FIG. 11 is a diagram of a second exemplary scenario according to an implementation described herein.

FIG. 11 is a diagram of a second exemplary scenario 1100 according to an implementation described herein. In scenario 1100, a user 1110 is sitting in a vehicle and may be looking down at the screen of mobile communication device 110. Mobile communication device 110 may detect dashboard camera 1120 based on wireless signals. For example, mobile communication device 110 may detect dashboard camera 1120 using a Bluetooth discovery process and may establish a Bluetooth connection in response. Alternatively, user 1110 may link/couple mobile communication device 110 to dashboard camera 1120. Dashboard camera 1120 may provide images and/or a video feed to mobile communication device 110 and mobile communication device 110 may monitor the detected images and/or video feed for changes. Mobile communication device 110 may detect motion after the traffic starts to move and may generate a display insert message window 1130 that displays the moving traffic as captured by dashboard camera 1120, along with a message that informs user 1110 that the traffic has started to move.

FIG. 12 is a diagram of a third exemplary scenario 1200 according to an implementation described herein. In scenario 1200, a user is waiting to meet someone for lunch. The user may access a calendar application that includes an event associated with a contact in the user's address book. The user may have scheduled a lunch with a contact named "John Smith." While the user is waiting, the user may receive a reminder 1210 of the upcoming event from the calendar application and may select to be alerted when "John Smith" is arriving.

At a later time, while the user is using and looking down on mobile communication device 110, mobile communication device 110 may detect movement in its environment based on a video feed being from left edge camera 270. Pattern recognition module 520 may analyze images from the video feed and may detect a person in the images. Pattern recognition module 520 may provide the images to environment analysis system 130 and environment analysis system 130 may perform facial recognition to identify the person in the images. Furthermore, environment analysis system 130 may provide information identifying the person to pattern recognition module 520. Pattern recognition module 520 may determine that the identified person is John Smith based on information stored in a contacts database on the mobile communication device. In response to the identification, and based on the alert selected by the user, mobile communication device 110 may generate a display insert 1220 that shows images of the approaching person, along with a message stating that "John Smith is approaching from the left."

Figure 13:
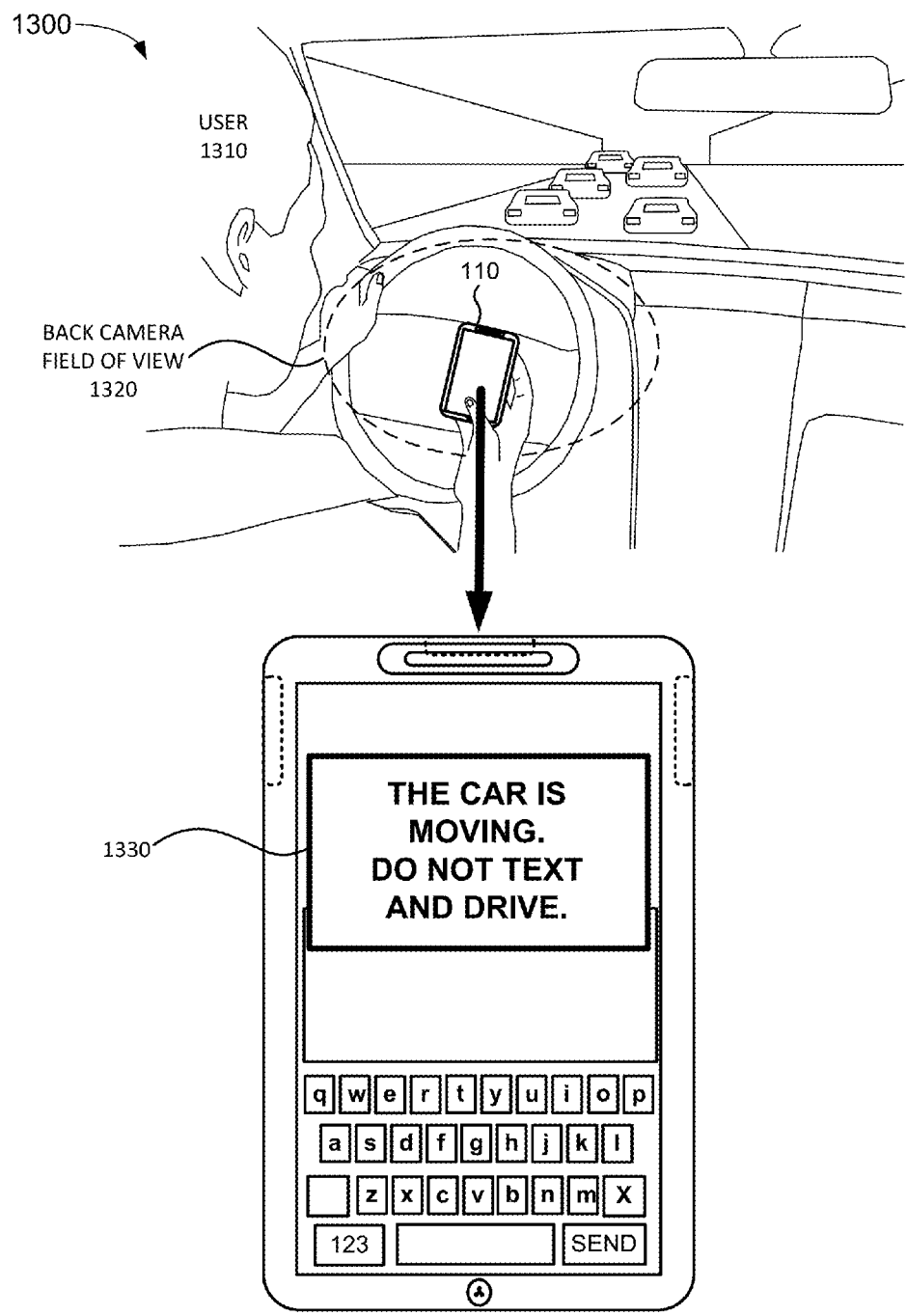
FIG. 13 is a diagram of a fourth exemplary scenario according to an implementation described herein.

FIG. 13 is a diagram of a third exemplary scenario 1300 according to an implementation described herein. In scenario 1300, a user 1310 may be driving a vehicle. User 1310 may be sitting in traffic and may be using mobile communication device 110 while the vehicle is not moving. Mobile communication device 110 may detect a vertical orientation and may select back camera 250 to monitor the environment within back camera field of view 1320. Back camera field of view 1320 may include the dashboard of the vehicle.

Pattern recognition module 520 may detect that the user is driving a vehicle based on a detected pattern associated with a dashboard. For example, pattern recognition module 520 may detect a steering wheel pattern, a speedometer pattern, and/or any other pattern associated with a vehicle dashboard. Once pattern recognition module 520 detects a dashboard pattern, pattern recognition module 520 may monitor whether the vehicle is moving. For example, pattern recognition module 520 may monitor the speedometer to determine whether the indicator needle is pointing to a non-zero speed and/or whether a digital speedometer display is displaying a number indicating a non-zero speed. Additionally or alternatively, pattern recognition module 520 may monitor the speed of the vehicle using another technique, such as by calculating the speed of movement of mobile communication device 110 based on multiple GPS calculations.

In response to determining that the vehicle is moving, a display insert window 1330 may be generated to warn the driver that the driver should avoid texting and driving. A warning message may discourage the driver from using mobile communication device 110 while the vehicle is moving. In some implementations, pattern recognition module 520 may temporarily disable the display of mobile communication device 110 in response to detecting that the vehicle is moving, in order to prevent the driver from using mobile communication device 110 while driving.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 8 and 9, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a handheld portable wireless communication device, the method comprising:
    obtaining, by the handheld portable wireless communication device, image data from an environment of the handheld portable wireless communication device using one or more cameras, wherein at least one of the one or more cameras is located on an edge of the handheld portable wireless communication device, wherein the edge corresponds to a plane perpendicular in relation to a plane of a display of the handheld portable wireless communication device, wherein the one or more cameras includes multiple cameras, and wherein obtaining the image data from the one or more cameras includes:
        selecting at least one of the multiple cameras based on an orientation of the handheld portable wireless communication device with respect to a horizontal position;
    detecting, by the handheld portable wireless communication device, a change in the environment of the handheld portable wireless communication device based on the obtained image data; and
    providing, by the handheld portable wireless communication device, the obtained image data from the one or more cameras in a display insert window on the display of the handheld portable wireless communication device, in response to the detected change in the environment.

2. The method of claim 1, wherein obtaining the image data from the one or more cameras includes:
    combining the obtained image data from two or more of the multiple cameras into a panoramic image of the environment.

3. The method of claim 1, wherein obtaining the image data from the one or more cameras further includes:
    connecting to a remote camera via a wireless connection.

4. The method of claim 1, wherein detecting the change in the environment of the handheld portable wireless communication device based on the obtained image data includes at least one of:
    detecting motion in the environment based on the image data;
    detecting a change in light intensity in the environment based on the image data; or
    detecting a change in a color profile of the environment based on the image data.

5. The method of claim 1, wherein detecting the change in the environment of the handheld portable wireless communication device based on the obtained image data includes:
zooming in on an area of the environment associated with the detected change.

6. The method of claim 1, further comprising:
performing pattern recognition on one or more images associated with the detected change in the environment to identify an object, entity, or event in the environment; and
providing information relating to the identified object, entity, or event to a user in connection with the display insert window.

7. The method of claim 6, wherein performing pattern recognition on one or more images associated with the detected change in the environment to identify an object, entity, or event in the environment includes:
extracting one or more features from the one or more images associated with the detected change in the environment; and
identifying the object, entity, or event in a database stored in the handheld portable wireless communication device based on the extracted one or more features.

8. The method of claim 6, wherein performing pattern recognition on the detected change in the environment to identify an object, entity, or event in the environment includes:
providing at least some of the image data to an environment analysis system; and
receiving information relating to the identified object, entity, or event from the environment analysis system.

9. The method of claim 6, wherein performing the pattern recognition on the detected change in the environment to identify an object, entity, or event in the environment includes:
determining that a person is present in the environment;
performing facial recognition to identify the person;
identifying a contact of the user based on the identified person; and
providing an indication to the user that the identified contact is in the environment, in response to identifying the contact.

10. The method of claim 9, further comprising:
identifying a calendar event associated with the identified contact; and
providing an indication of the identified calendar event to the user, in response to identifying the calendar event.

11. The method of claim 9, further comprising:
receiving a selection from the user to inform the user if the contact is detected in the environment.

12. A handheld portable wireless communication device comprising:
one or more cameras located on edges of the handheld portable wireless communication device, wherein the edges correspond to planes perpendicular in relation to a plane of a display of the handheld portable wireless communication device; and
logic configured to:
obtain image data of an environment of the handheld portable wireless communication device from at least one of the one or more cameras, wherein the one or more cameras includes multiple cameras, and wherein, when obtaining the image data from the one or more cameras, the logic is further configured to:
select at least one of the multiple cameras based on an orientation of the handheld portable wireless communication device with respect to a horizontal position;
detect a change in an environment of the handheld portable wireless communication device based on the obtained image data; and
provide the obtained image data from the at least one of the one or more cameras in a display insert window on the display of the handheld portable wireless communication device, in response to the detected change in the environment.

13. The handheld portable wireless communication device of claim 12, wherein the one or more cameras located on the edges of the handheld portable wireless communication device include:
a first camera located on a left edge of the handheld portable wireless communication device;
a second camera located on a top edge of the handheld portable wireless communication device; and
a third camera located on a right edge of the handheld portable wireless communication device.

14. The handheld portable wireless communication device of claim 12, wherein, when obtaining the image data from at least one of the one or more cameras, the logic is further configured to:
connect to a remote camera via a wireless connection.

15. The handheld portable wireless communication device of claim 12, wherein, when detecting the change in the environment of the handheld portable wireless communication device based on the obtained image, the logic is further configured to at least one of:
detect motion in the environment based on the image data;
detect a change in light intensity in the environment based on the image data; or
detect a change in a color profile of the environment based on the image data.

16. The handheld portable wireless communication device of claim 12, wherein the logic is further configured to:
perform pattern recognition on one or more images associated with the detected change in the environment to identify an object, entity, or event in the environment; and
provide information relating to the identified object, entity, or event to a user in connection with the display insert window.

17. The handheld portable wireless communication device of claim 16, wherein, when performing the pattern recognition on the detected change in the environment to identify an object, entity, or event in the environment, the logic is further configured to:
determine that a person is present in the environment;
perform facial recognition to identify the person;
identify a contact of the user based on the identified person; and
provide an indication to the user that the identified contact is in the environment, in response to identifying the contact.

18. One or more non-transitory computer-readable media, storing instructions executable by one or more processors, the one or more non-transitory computer-readable media comprising:
one or more instructions to obtain image data from a camera located on an edge of a handheld portable wireless communication device located in an environment, wherein the edge corresponds to a plane perpendicular in relation to a plane of a display of the handheld portable wireless communication device, wherein the one or more instructions to obtain the image data include:

one or more instructions to select the camera from a plurality of cameras based on an orientation of the handheld portable wireless communication device with respect to a horizontal position;

one or more instructions to detect a change in the environment of the handheld portable wireless communication device based on the obtained image data based on at least one of a detected motion, a detected change in light intensity, or a detected color profile in the environment;

one or more instructions to perform pattern recognition on one or more images associated with the detected change in the environment to identify an object, entity, or event in the environment;

one or more instructions to generate information relating to the identified object, entity, or event; and one or more instructions to provide the obtained image data from the camera in a display insert window on the display of the handheld portable wireless communication device, in response to the detected change in the environment, wherein the display insert window includes the generated information relating to the identified object, entity, or event.

* * * * *